(12) United States Patent
Briand

(10) Patent No.: US 7,288,737 B2
(45) Date of Patent: Oct. 30, 2007

(54) LASER/MIG HYBRID WELDING PROCESS WITH A HIGH WIRE SPEED

(75) Inventor: Francis Briand, Paris (FR)

(73) Assignees: La Soudure Autogene Francais, Paris (FR); L'Air Liquide, Societe Anonyme A Directoire et Conseil de Surveillance pour L'Etude et L'Exploitation des Procedes Geordes Claude, Paris (FR)

( * ) Notice: Subject to any disclaimer, the term of this patent is extended or adjusted under 35 U.S.C. 154(b) by 0 days.

(21) Appl. No.: 11/221,215

(22) Filed: Sep. 7, 2005

(65) Prior Publication Data

US 2006/0054603 A1 Mar. 16, 2006

(30) Foreign Application Priority Data

Sep. 7, 2004 (FR) .................................. 04 51970

(51) Int. Cl.
*B23K 9/00* (2006.01)
*B23K 26/00* (2006.01)
(52) U.S. Cl. .............................. 219/121.64; 219/137 R
(58) Field of Classification Search ............ 219/137 R, 219/121.63, 121.64
See application file for complete search history.

(56) References Cited

U.S. PATENT DOCUMENTS

| 6,034,343 | A | * | 3/2000 | Hashimoto et al. | ............ 219/74 |
| 6,642,483 | B1 | * | 11/2003 | Koga et al. | ............ 219/137 PS |
| 6,852,945 | B2 | * | 2/2005 | Harth, III | .............. 219/121.64 |
| 7,015,417 | B2 | * | 3/2006 | Takikawa et al. | ...... 219/121.64 |
| 7,019,256 | B2 | * | 3/2006 | Sonoda et al. | ......... 219/121.63 |
| 2003/0234241 | A1 | | 12/2003 | Harth et al. | ........... 219/121.64 |

FOREIGN PATENT DOCUMENTS

DE 198 49 117 * 5/2000
DE 198 49 117 A1 * 5/2000

OTHER PUBLICATIONS

French Search Report for FR 04 51970.

* cited by examiner

*Primary Examiner*—Kevin P. Kerns
(74) *Attorney, Agent, or Firm*—Christopher J. Cronin

(57) ABSTRACT

Methods for hybrid laser/MIG welding processes. A bevel formed between the edges of material to be welded together is partially filled with molten metal. The molten metal is delivered in the form of a filler wire, which is melted by a combined electric arc and laser beam. The welding speed is at least 2 m/min, the filler wire feed speed is at least 20 m/min and the filler wire diameter is less than 1.2 mm.

15 Claims, 1 Drawing Sheet

LASER/MIG HYBRID WELDING PROCESS WITH A HIGH WIRE SPEED

This application claims the benefit of priority under 35 U.S.C. § 119 (a) and (b) to French application No. 04 51970, filed Sep. 7, 2004, the entire contents of which are incorporated herein by reference.

BACKGROUND

The present invention relates to a laser/MIG hybrid welding process using high wire speeds.

When it is desired to weld one tube or pipe to another (butt welding) or else to manufacture a tube or pipe by longitudinally welding the two longitudinal edges of a metal sheet shaped beforehand into a "U" and then an "O", bevels are generally provided on the edges to be welded together, typically forming a groove in the shape of a "V", an "X" or other shape.

If it is desired to fill this bevel by depositing metal therein by carrying out a laser/MIG (Metal Inert Gas) hybrid welding process, a diagram showing the principle of which is given in FIG. 1, it is necessary to achieve high welding rates, that is to say rates of at least a few m/min, so as to maintain the productivity of the process.

Now, the higher the welding rate, the higher the wire feed rate has to be, so as to be able to rapidly fill the volume of the bevel, that is to say "V"-shaped, "X"-shaped or other shaped groove, at the welding speed in question.

Under these conditions, as soon as welding rates of around 2 m/min or higher are reached, this results, typically for thicknesses of 8 mm and taking into account the bevel shapes adopted, in having to increase the feed speed of the wire beyond the limits usually encountered on wire feeders, namely typically around 20 m/min.

One solution for increasing the rate of deposition is therefore to increase the wire diameter, since the wires conventionally used have a diameter of 1.2 mm.

However, the problem that then arises is that, for a constant rate of metal deposited, a higher current is therefore needed to melt the high-diameter wires, that is to say those of around 1.6 mm in diameter, but in this case the process runs into the current limitation of most MIG generators, which is conventionally around 450 A, which limitation therefore does not allow currents greater than this value to be delivered.

The problem which then arises is how to be able to fill a bevel at high speed without encountering the abovementioned drawbacks and limitations.

SUMMARY

The solution of the invention is therefore a laser/MIG hybrid welding process, in which at least one portion of a bevel provided between the edges to be welded together is filled by depositing therein molten metal delivered in the form of at least one filler wire, said filler wire being melted by means of an electric arc and a laser beam which are combined together, characterized in that the welding is carried out at a welding speed of at least 2 m/min, the filler wire feed speed is at least 20 m/min, and the filler wire diameter is less than 1.2 mm.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Depending on the case, the process of the invention may include one or more of the following characteristics:
- a single electric arc and a single laser beam are used, these being combined with each other;
- the edges to be welded are those of a single metal workpiece or those of two different metal workpieces;
- the thickness of the workpieces to be welded, which is measured at the edges to be welded, is between 6 and 60 mm;
- the edges to be welded are those of one or more tubes or pipes;
- the bevel made between the edges to be welded has a "V" or "X" shape;
- the welding is carried out at a welding speed of between 2.5 and 4 m/min;
- the filler wire feed speed is at least 22 m/min, preferably between 25 and 35 m/min;
- the filler wire diameter is less than 1.19 mm, preferably less than 1.17 mm;
- the filler wire diameter is greater than 0.4 mm;
- the filler wire diameter is less than 1.1 mm, preferably between 1 and 0.8 mm;
- the filler wire diameter is between 0.6 and 1.5 mm;
- the metal workpiece or workpieces to be welded are made of carbon steel or stainless steel;
- the wire is a solid or flux-core wire;
- the bevel is completely filled by depositing metal coming from the wire melted by the arc and the laser beam;
- the electric arc is obtained by applying a current of 350 A to 500 A, preferably 400 A to 500 A, and the laser beam is obtained by means of a laser device of the $CO_2$, YAG or diode type; and
- a shielding gas is used during the welding, said gas consisting of helium, argon and oxygen; helium, argon and $CO_2$; helium and argon; argon and oxygen; or argon and $CO_2$. The choice of the most appropriate gas for welding any particular material is within the competence of a person skilled in the art and may be made by way of empirical tests.

In other words, according to the invention, it has been found in practice that, to solve the abovementioned problem, it is judicious to increase the wire speed to more than 20 m/min and to do so up to values of 30 to 40 m/min, something which can in general be quite easily achieved by modifying the reduction ratios of the wire feeder motor, but still using at the same time a wire with a diameter of less than 1.2 mm, contrary to what was employed in the prior art.

This is because, at a constant rate of metal deposited, the reduction in filler wire diameter has the consequence of reducing the current needed. Thus, it is possible, for the maximum value of the current delivered by the welding generator, to increase the amount of molten metal and therefore to fill more of the bevel at the welding speed in question, which is greater than 2 m/min.

Figure 1:
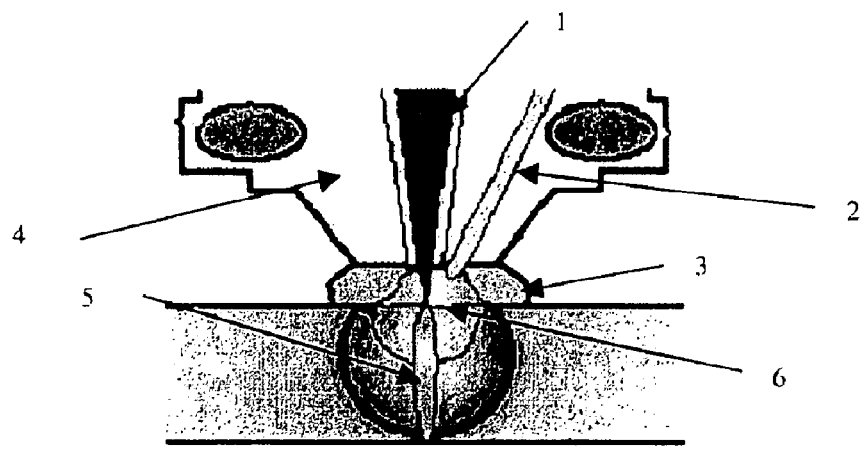
FIG. 1 illustrates a schematic representation of one embodiment, according to the current invention, of a method for laser/MIG hybrid welding.

FIG. 1 illustrates the laser/MIG hybrid welding process of the invention, showing the filling of a bevel located at the edges of two workpieces to be welded together, by depositing, in said bevel, molten metal delivered in the form of a filler wire 2, which is melted by means of an electric arc 6 and a laser beam 1 which are combined with each other beneath a welding nozzle 4, with the formation of a capillary or keyhole 5 beneath the zone in which the arc combines with the laser beam. During welding, the zone is shielded from the ambient air by a shielding gas 3, distributed beneath the nozzle 4.

Figure 2:
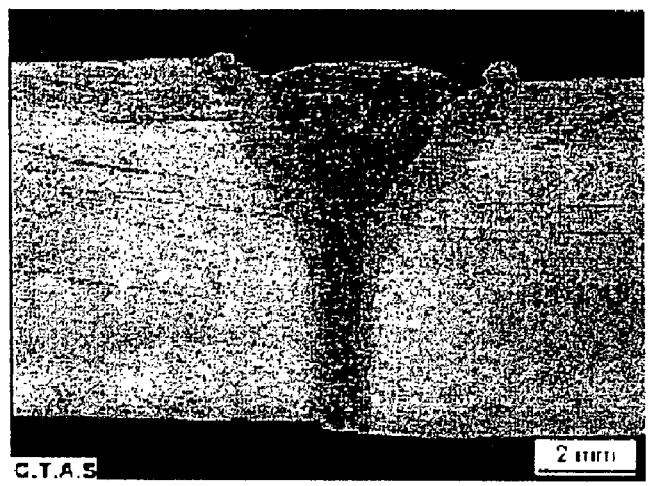
FIG. 2 illustrates a welding macrograph of a hybrid weld.

The photograph in FIG. 2 shows a welding macrograph (a comparative example according to the prior art) obtained in MIG hybrid welding on a bevel produced in a plate 8 mm in thickness according to the process of FIG. 1. The welding speed was 3 m/min, the laser power was 8 kW, the wire feed speed was 19 m/min, the wire diameter was 1.2 mm and the welding current was 450 A. As may be seen, the bevel is not completely filled in this case.

Figure 3:
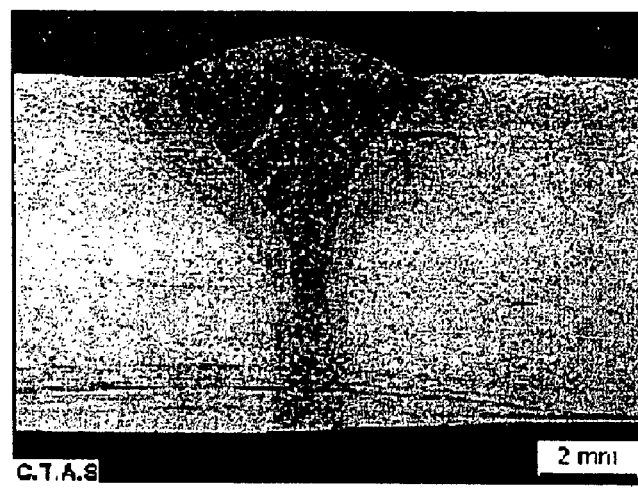
FIG. 3 illustrates a welding macrograph of a hybrid weld, as produced according to one embodiment of the method of the current invention.

In contrast, the photograph in FIG. 3 shows the same trial but, in this case, the wire feed speed was 30 m/min and the wire diameter was 1 mm, that is to say according to the process of the invention.

As may be seen in this case, the bevel is then completely filled when the process of the invention is employed, which clearly demonstrates the solution of the problem of how to completely fill the bevel thanks to the adoption of a wire speed of greater than 20 m/min and a wire diameter of less than 1.2 mm.

More generally, the welding process of the present invention is particularly suitable for the manufacture of tubes or pipes on automatic welding lines and to the butt-welding or to the laying of pipes, especially in offshore or on-shore applications.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for laser/MIG hybrid welding, said method comprising welding by depositing molten metal into at least a portion of a bevel formed between edges to be welded together, wherein:
   a) said molten metal is delivered as at least one filler wire;
   b) said filler wire is melted by a combined electric arc/laser beam means;
   c) said depositing occurs at a welding speed of at least about 2 m/min;
   d) said filler wire has a feed speed of at least about 20 m/min; and
   e) said filler wire has a diameter of less than about 1.1 mm.

2. The method of claim 1, wherein said edges to be welded are from a single metal workpiece or from two different metal workpieces.

3. The method of claim 1, wherein said edges to be welded are from at least one tube or pipe.

4. The method of claim 1, wherein said bevel has a "V" or an "X" shape.

5. The method of claim 1, wherein said welding speed is between about 2.5 m/min and about 4 m/min.

6. The method of claim 1, wherein said feed speed is at least about 22 m/min.

7. The method of claim 6, wherein said feed speed is between about 25 m/min and about 35 m/min.

8. The method of claim 1, wherein said filler wire diameter is between about 1 mm and about 0.8 mm.

9. The method of claim 2, wherein said workpiece or workpieces are made of either carbon steel or stainless steel.

10. The method of claim 1, wherein said filler wire is either a solid wire or a flux-cored wire.

11. The method of claim 1, wherein:
   a) said electric arc is obtained from a current between about 350 A and about 500 A; and
   b) said laser beam is obtained from a laser device comprising at least one member selected from the group consisting of:
      1) a $CO_2$ type laser;
      2) a YAG type laser; and
      3) a diode type laser.

12. The method of claim 1, further comprising shielding said welding with a shielding gas, wherein said shielding gas comprises at least one member selected from the group consisting of:
   a) a helium, argon, and oxygen gas mixture;
   b) a helium, argon, and carbon dioxide gas mixture;
   c) a helium and argon gas mixture;
   d) an argon and oxygen gas mixture; and
   e) an argon and carbon dioxide gas mixture.

13. The method of claim 1, wherein said bevel is completely filled by depositing metal melted by said arc and said laser beam.

14. A method for laser/MIG hybrid welding, said method comprising welding by depositing molten metal into at least a portion of a bevel formed between edges to be welded together, wherein:
   a) said molten metal is delivered as at least one filler wire;
   b) said filler wire is melted by a combined electric arc/laser beam means;
   c) said depositing occurs at a welding speed between about 2.5 m/min and about 4 m/min;
   d) said filler wire has a feed speed between about 25 m/min and about 35 m/min; and
   e) said filler wire has a diameter between about 1 mm and about 0.8 mm.

15. A method for laser/MIG hybrid welding, said method comprising welding by depositing molten metal into at least a portion of a bevel formed between edges to be welded together, wherein:
   a) said molten metal is delivered as at least one filler wire;
   b) said filler wire is melted by a combined electric arc/laser beam means;
   c) said depositing occurs at a welding speed of at least about 2 m/min;
   d) said filler wire has a feed speed of at least about 20 m/min;
   e) said filler wire has a diameter of less than about 1.1 mm;
   f) said electric arc is obtained from a current between about 350 A and about 500 A; and
   g) said laser beam is obtained from a laser device comprising at least one member selected from the group consisting of:
      1) a $CO_2$ type laser;
      2) a YAG type laser; and
      3) a diode type laser; and h) said welding further comprises shielding with a shielding gas, wherein said shielding gas comprises at least one member selected from the group consisting of:
1) a helium, argon, and oxygen gas mixture;
2) a helium, argon, and carbon dioxide gas mixture;
3) a helium and argon gas mixture;
4) an argon and oxygen gas mixture; and
5) an argon and carbon dioxide gas mixture.

* * * * *